J. M. COLEMAN.
CAR CONSTRUCTION.
APPLICATION FILED OCT. 28, 1912.

1,068,629.  Patented July 29, 1913.

Witnesses
Stuart R. W. Allen
G. M. Moreland

Inventor
James M. Coleman.
By Fred B. Fetherstonhaugh
His Attorney

UNITED STATES PATENT OFFICE.

JAMES M. COLEMAN, OF MONTREAL, QUEBEC, CANADA.

CAR CONSTRUCTION.

1,068,629.   Specification of Letters Patent.   Patented July 29, 1913.

Application filed October 28, 1912. Serial No. 728,101.

*To all whom it may concern:*

Be it known that I, JAMES M. COLEMAN, of the city of Montreal, in the Province of Quebec and Dominion of Canada, have invented certain new and useful Improvements in Car Construction, of which the following is a full, clear, and exact description.

This invention relates to improvements in means for connecting car trucks to car bodies without impairing the flexibility of the car body in its relation to the trucks.

The object of the invention is to provide a connection so designed and arranged that the trucks of a car will not leave the car body in case of an accident, thereby preventing the telescoping of the cars.

Figure 1:
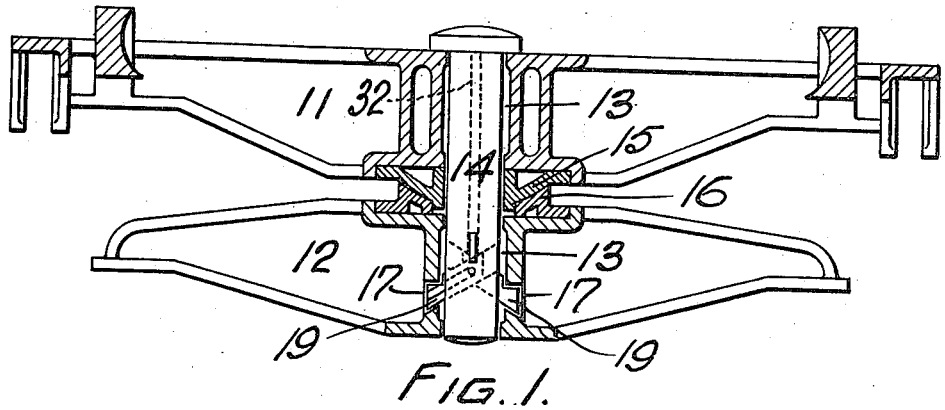
Figures 2, 4, 5:
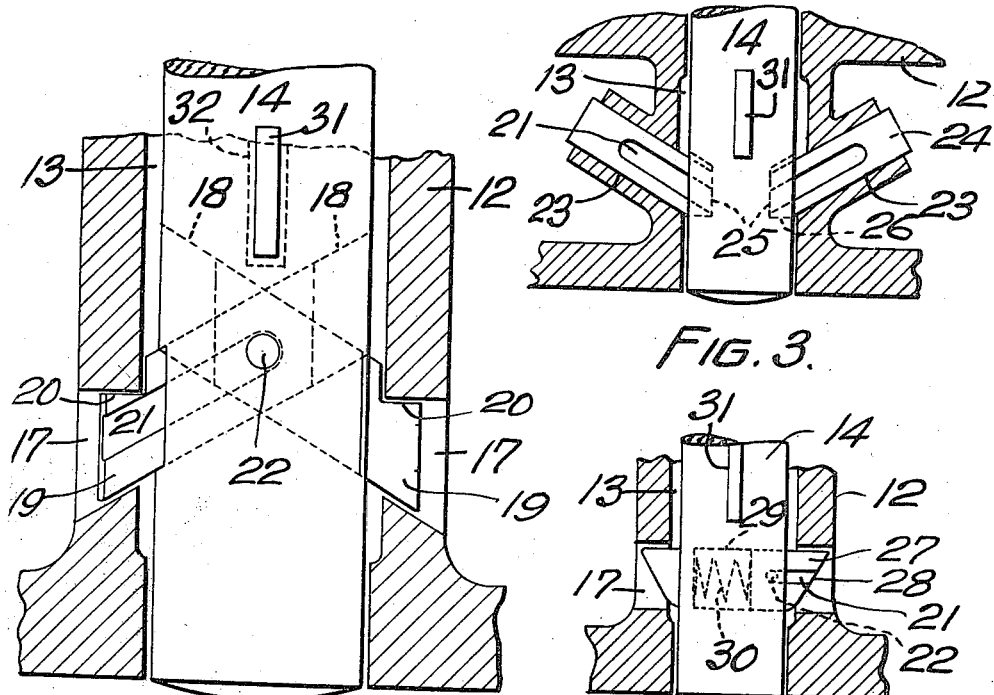

In the drawings which illustrate the invention:—Figure 1 is a transverse sectional view through the body and truck bolsters of the car, and shows the invention in operative form. Fig. 2 is an enlarged detail view partly in section showing the construction and arrangement of the latches. Fig. 3 is a similar view showing a slightly modified arrangement of the latches. Fig. 4 is a modification of the device. Fig. 5 is a fragmentary view, showing the ends of the latches.

Referring more particularly to the drawings, 11 designates the body bolster and 12 the truck bolster, each of which is provided with a central circular aperture 13 for the passage of the king pin 14. The lower side of the body bolster is provided with a convexly surfaced bearing member 15 which seats and automatically centers itself in the concavely surfaced member 16 carried on the upper side of the truck bolster. These two members 15 and 16 are the bearings upon which the entire weight of the car body is supported and transmitted to the trucks. The walls surrounding the pin opening 13 of the truck bolster are provided with a pair of vertically disposed slots 17 which face the ends of the bolster.

The king pin 14 is provided near its lower end with a pair of oppositely sloping slots 18 arranged in parallel vertical planes. Slidably mounted in each of these slots is a latch 19 of such length that it may be contained entirely in the pin slot. The lower end of each latch is cut away from the upper edge to form a horizontal surface 20 adapted to engage the top of the slots 17, as clearly shown in Fig. 2. In order to prevent the latches escaping entirely from the slots, the latches are each provided along one side with a groove 21 extending from the lower end of the latch almost to the upper end thereof. This groove is adapted to be engaged by a pin or lug 22 mounted on the king pin and projecting into the latch slots 18. In this way, when it is desired to remove the latches, they may be forced upwardly in the slots and withdrawn from the upper end, but they cannot escape accidentally as the force of gravity operates to hold them in the lower ends of the slots from which they cannot escape, owing to the lugs 22 abutting the upper ends of the grooves 21.

In Fig. 3, a slight modification of this device is shown, and consists of a pair of angularly disposed slots 23 formed in the truck bolster and occupying approximately the same position as the slots 17. Latch bolts 24 are slidably mounted in these slots and engage recesses 25 formed near the lower end of the king pin. These latches 25 are provided with grooves 21 engaged by pins 22 for the purpose already described. In this form, the lower edge of the lower end of each latch bolt is flattened, as shown at 26.

In Fig. 4 an alternative form of the device is shown, which consists of latch bolts 27 having the outer ends 28 thereof suitably sloped to permit the easy insertion of the king pin. These latches are mounted in slots 29 and are pressed outwardly by springs 30, so that when the king pin is inserted the latches will be forced out into the slots 17 by the springs and will automatically lock the king pin against removal. The same arrangement of pin and groove as already described may be applied to this form to prevent the loss of the latches when the king pin is removed from the bolster.

In order to properly aline the king pin with the bolster slot, the pin is provided with projecting lugs or fins 31 which engage grooves 32 formed in the bolster, and so arranged that the pin cannot be lowered unless it is properly alined to enable the latches to move automatically into the slots.

The operation of the device is so obvious that only an outline need be given. When the pin is dropped into place, the walls of the aperture 13 hold the latches up in their grooves, but when these latches come opposite the slots 17 they slide out by gravity, so that the king pin cannot be removed without pressing the latches up into the notches. As these latches are operated by gravity, vibration, etc., only operates to keep them in their proper position.

Having thus described my invention, what I claim is:—

1. A device of the character described comprising the combination with a body bolster and a truck bolster of a king pin pivotally connecting said bolsters, and gravity latches slidably mounted in the pin engaging the truck bolster and holding the pin against removal.

2. A device of the character described comprising the combination with a body bolster and a truck bolster having slots therein of a king pin pivotally connecting said bolsters, and gravity latches slidably mounted in the pin arranged to automatically engage through the bolster slots to prevent removal of the pin.

3. A device of the character described comprising the combination with a body bolster and a truck bolster having slots therein of a king pin pivotally connecting said bolsters, a pair of latches slidably mounted in said pin and movable by the force of gravity to engage through the notches of the truck bolster, said latches each having in one side thereof a groove extending from the bolster engaging end to within a short distance of the opposite end, and pins mounted in the king pin engaging said grooves and holding the latches in the king pin.

4. In a device of the character described the combination with a body bolster and a truck bolster of a king pin pivotally connecting said bolsters, and slidable gravity latches arranged to automatically connect the king pin and truck bolster on the insertion of the pin and to hold the pin against removal.

5. A device of the character described comprising the combination with a body bolster and a truck bolster having slots therein and grooves intermediate said slots of a king pin pivotally connecting said body and truck bolsters, latches slidably mounted in said pin and movable by gravity into engagement through the bolster slots, and ribs on said pin engaging in the bolster grooves to aline the latches with the bolster slots.

6. In a car construction, the combination with a pair of superposed bolsters, of a king pin pivotally connecting said bolsters, a slidably mounted latch arranged to automatically secure said pin in position upon the insertion thereof, and means for limiting the movement of said latch in one direction.

In witness whereof I have hereunto set my hand in the presence of two witnesses.

JAMES M. COLEMAN.

Witnesses:
　STUART R. W. ALLEN,
　G. N. MORELAND.

---

Copies of this patent may be obtained for five cents each, by addressing the "Commissioner of Patents, Washington, D. C."